(12) United States Patent
Adachi et al.

(10) Patent No.: US 9,054,442 B2
(45) Date of Patent: Jun. 9, 2015

(54) TERMINAL CONNECTION STRUCTURE HAVING A HOLDER TO HOLD TWO TERMINALS IN AN OVERLAPPING STATE

(75) Inventors: Hideomi Adachi, Kosai (JP); Hidehiko Kuboshima, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 96 days.

(21) Appl. No.: 13/876,720

(22) PCT Filed: Sep. 29, 2011

(86) PCT No.: PCT/JP2011/072457
§ 371 (c)(1),
(2), (4) Date: Mar. 28, 2013

(87) PCT Pub. No.: WO2012/043760
PCT Pub. Date: Apr. 5, 2012

(65) Prior Publication Data
US 2013/0196558 A1     Aug. 1, 2013

(30) Foreign Application Priority Data
Oct. 1, 2010    (JP) ................................ 2010-223681

(51) Int. Cl.
*H01R 13/64*     (2006.01)
*H01R 13/516*    (2006.01)
(Continued)

(52) U.S. Cl.
CPC .............. *H01R 13/516* (2013.01); *H01R 25/14* (2013.01); *H01R 2201/26* (2013.01); *H01R 4/48* (2013.01); *H01R 13/193* (2013.01); *H01R 13/6315* (2013.01); *H01R 2105/00* (2013.01)

(58) Field of Classification Search
USPC ................................................ 439/247–248
See application file for complete search history.

(56) References Cited

U.S. PATENT DOCUMENTS 5,893,768 A * 4/1999 Gawron et al. ............... 439/248
6,159,030 A * 12/2000 Gawron et al. ............... 439/247
(Continued)

FOREIGN PATENT DOCUMENTS

EP    1 313 175 A1    5/2003
JP    3-104973 U    10/1991
(Continued)

OTHER PUBLICATIONS

Extended European Search Report dated Feb. 27, 2014 issued in a corresponding European Patent Application No. 11829313.3.
(Continued)

*Primary Examiner* — Chandrika Prasad
(74) *Attorney, Agent, or Firm* — Sughrue Mion, PLLC

(57) ABSTRACT

[Problem] To provide a terminal connection structure that can reliably connect terminals together even if the positional offset between the terminals is great.

[Solution] The terminal connection structure connects a busbar and a first terminal connected to the coil of a motor. The terminal connection structure is provided with: a base having a bottom wall; a terminal holder that can hold the first terminal and the busbar in an overlapping state; and a mobile attachment section. The mobile attachment section has: a bottom plate section that is provided to the terminal holder and that is parallel to the bottom wall; and a holding slit that is provided to the base, is entered by the bottom plate section, and is larger than the bottom plate section. The mobile attachment section attaches the terminal holder to the base movably in parallel to the surface of the bottom wall.

3 Claims, 8 Drawing Sheets

(51) Int. Cl.
H01R 13/631 (2006.01)
H01R 25/14 (2006.01)
H01R 4/48 (2006.01)
H01R 13/193 (2006.01)
H01R 105/00 (2006.01)

(56) References Cited

U.S. PATENT DOCUMENTS

| | | | | |
|---|---|---|---|---|
| 6,325,652 | B1 * | 12/2001 | Grant | 439/248 |
| 6,773,314 | B2 * | 8/2004 | Mills et al. | 439/850 |
| 6,896,674 | B1 * | 5/2005 | Woloszko et al. | 606/41 |
| 7,059,882 | B2 * | 6/2006 | Sugita et al. | 439/247 |
| 7,390,207 | B2 * | 6/2008 | Noguchi et al. | 439/248 |
| 7,641,491 | B2 * | 1/2010 | Altonen et al. | 439/247 |
| 2007/0123105 | A1 | 5/2007 | Tsukashima et al. | |
| 2008/0009144 | A1 | 1/2008 | Hsu | |

FOREIGN PATENT DOCUMENTS

| | | |
|---|---|---|
| JP | 2002-025697 A | 1/2002 |
| JP | 2002-093531 A | 3/2002 |
| JP | 2007-234322 A | 9/2007 |
| JP | 2009-283391 A | 12/2009 |
| WO | 98/57827 A1 | 12/1998 |

OTHER PUBLICATIONS

Communication dated Aug. 19, 2014 from the Japanese Patent Office in counterpart application No. 2010-223681.

* cited by examiner

US 9,054,442 B2

TERMINAL CONNECTION STRUCTURE HAVING A HOLDER TO HOLD TWO TERMINALS IN AN OVERLAPPING STATE

CROSS REFERENCE TO RELATED APPLICATIONS

This application is a National Stage of International Application No. PCT/JP2011/072457 filed Sep. 29, 2011, claiming priority based on Japanese Patent Application No. 2010-223681, filed Oct. 1, 2010, the contents of all of which are incorporated herein by reference in their entirety.

TECHNICAL FIELD

This invention relates to a terminal connection structure for connecting terminals to each other, in particular, the terminal connection structure for connecting to a power device to which voltage for running a vehicle is applied.

BACKGROUND ART

Currently, a hybrid vehicle and an electric vehicle which are driven by a rotary drive power of a motor are used for reducing an impact on an environment. A power device such as a battery, an inverter, a motor, a generator, and the like to which voltage for running a vehicle is applied is mounted on a vehicle driven by a rotary drive power of a motor such as a hybrid vehicle and an electric vehicle. Because a value of an electric current flowing through these power devices is high, cables used for connecting the power devices to each other are thicker than electric wires used for transmitting a signal and supplying electric power to electronic devices. Further, conventionally, various terminal connection structures (for example, see PTL 1) are used for connecting these thick cables to the power devices.

The terminal connection structure described in the PTL 1 includes: a male connector; and a female connector configured to be connected to each other. The male connector includes: a male connector housing; and male terminals respectively connected to coils of a motor as the power device and received in the male connector housing. The male connector housing includes: an outer tubular section as a base; an inner tubular section received in the outer tubular section and fitted to a female connector housing; and a thin flexible coupling piece continued to the outer and inner tubular sections. The female connector includes: a female connector housing; and female terminals received in the female connector housing and configured to be connected to the male terminals.

The terminal connection structure described in the PTL 1 allows the terminals to be connected to each other by elastically deforming the thin coupling piece even if a position of the male connector, namely, the male terminal connected to the coil of the motor is offset upon fitting the female connector to the male connector.

CITATION LIST

Patent Literature

[PTL 1]
JP, A, 2002-93531

SUMMARY OF INVENTION

Technical Problem

According to the terminal connection structure described in the PTL 1, the outer and inner tubular sections of the male connector housing are coupled to each other by the thin coupling piece, and the terminals are connected to each other by elastically deforming the thin coupling piece. However, depending on the positional offset of the terminals, the elastically deformed thin coupling piece may prevent the inner tubular section from moving. Namely, the terminal connection structure described in the PTL 1 only supports a small positional offset of the terminals.

Accordingly, an object of the present invention is to provide a terminal connection structure that can reliably connect terminals together even if the positional offset of the terminals is great.

Solution to Problem

For attaining the object, according to a first aspect of the present invention, there is provided a terminal connection structure for connecting a second terminal to a first terminal which is connected to a power device, said terminal connection structure including:
a base having a bottom wall;
a terminal holder that can hold the first and second terminals in an overlapping state; and
a mobile attachment section having a parallel wall that is provided on one of the base and the terminal holder and that is parallel to the bottom wall, and a holding slit that is provided to the other of the base and the terminal holder, is entered by the parallel wall, and is larger than the parallel wall, and attaching the terminal holder to the base movably and parallel to a surface of the bottom wall.

According to a second aspect of the present invention, there is provided the terminal connection structure as described in the first aspect, further including: a clip terminal having a pair of contact pieces for holding the first and second terminals in the overlapping state therebetween, and a bias coupling section continued to the pair of contact pieces and biasing the pair of contact pieces holding the first and second terminals therebetween toward a direction close to each other,
said clip terminal configured to be moved close to the terminal holder in a direction crossing the first and second terminals in the overlapping state, and attached to the terminal holder with the pair of contact pieces holding the first and second terminals in the overlapping state therebetween.

According to a third aspect of the present invention, there is provided the terminal connection structure as described in the second aspect, further including:
a clip terminal holder covering the clip terminal and having a locking section to be locked with the terminal holder.

According to a fourth aspect of the present invention, there is provided the terminal connection structure as described in any one of the first to third aspects, further including:
a press fixing member configured to be attached to the base, and pressing the first terminal toward the bottom wall when attached to the base.

According to the terminal connection structure as described in the first aspect of the present invention, when the parallel wall provided on one of the terminal holder and the base is inserted into the holding slit that is larger than the parallel wall, the terminal holder becomes movable in a direction parallel to a surface of the bottom wall of the base. Therefore, there is nothing that prevents the terminal holder from moving other than an inner wall of the holding slit.

According to the terminal connection structure as described in the second aspect of the present invention, when the first and second terminals are held between the pair of contact pieces of the clip terminal close to these terminals along a direction crossing a longitudinal direction of these terminals in the overlapping state, these terminals are connected to each other. Therefore, even if the first and second terminals are arranged parallel to each other with a gap, these terminals can be surely connected to each other.

Further, because the clip terminal includes the pair of contact pieces and the bias coupling section biasing the pair of contact pieces toward a direction close to each other, the terminals in the overlapping state can be held between the pair of contact pieces. Therefore, the first and second terminals can be surely and electrically connected to each other.

According to the terminal connection structure as described in the third aspect of the present invention, because the terminal connection structure includes the clip terminal holder covering the clip terminal and locked with the terminal holder, the clip terminal holder prevents the clip terminal from falling out.

According to the terminal connection structure as described in the fourth aspect of the present invention, because the terminal connection structure includes the press fixing member pressing the first terminal toward the bottom wall when attached to the base, the first terminal can be positioned in a thickness direction of the bottom wall of the base by the press fixing member.

Advantageous Effects of Invention

As explained above, according to the invention as described in the first aspect, because there is nothing that prevents the terminal holder from moving other than an inner wall of the holding slit, the terminal holder becomes movable with respect to the bottom wall of the base within a gap between the holding slit and the parallel wall. Therefore, by adjusting properly a size of the holding slit, the terminals can be moved widely with respect to the base, and even if the positional offset between the terminals is great, the terminals are surely connected to each other.

According to the invention as described in the second aspect, even if the first and second terminals are arranged parallel to each other with a gap, these terminals can be surely connected to each other. Therefore, when the first and second terminals are arranged parallel to each other with a gap, a width of the terminal connection structure can be further reduced than when these terminals are arranged on the same plane. As a result, the terminal connection structure can be downsized.

By holding the terminals in the overlapping state between the pair of contact pieces of the clip terminal, the first and second terminals can be surely and electrically connected to each other. Therefore, the terminals can be surely connected to each other.

According to the invention as described in the third aspect, because the clip terminal holder prevents the clip terminal from falling out, a connection between the terminals is prevented from being released unexpectedly.

According to the invention as described in the fourth aspect, the first terminal can be positioned in a thickness direction of the bottom wall of the base by the bias fixing member.

DESCRIPTION OF EMBODIMENTS

Figure 1:
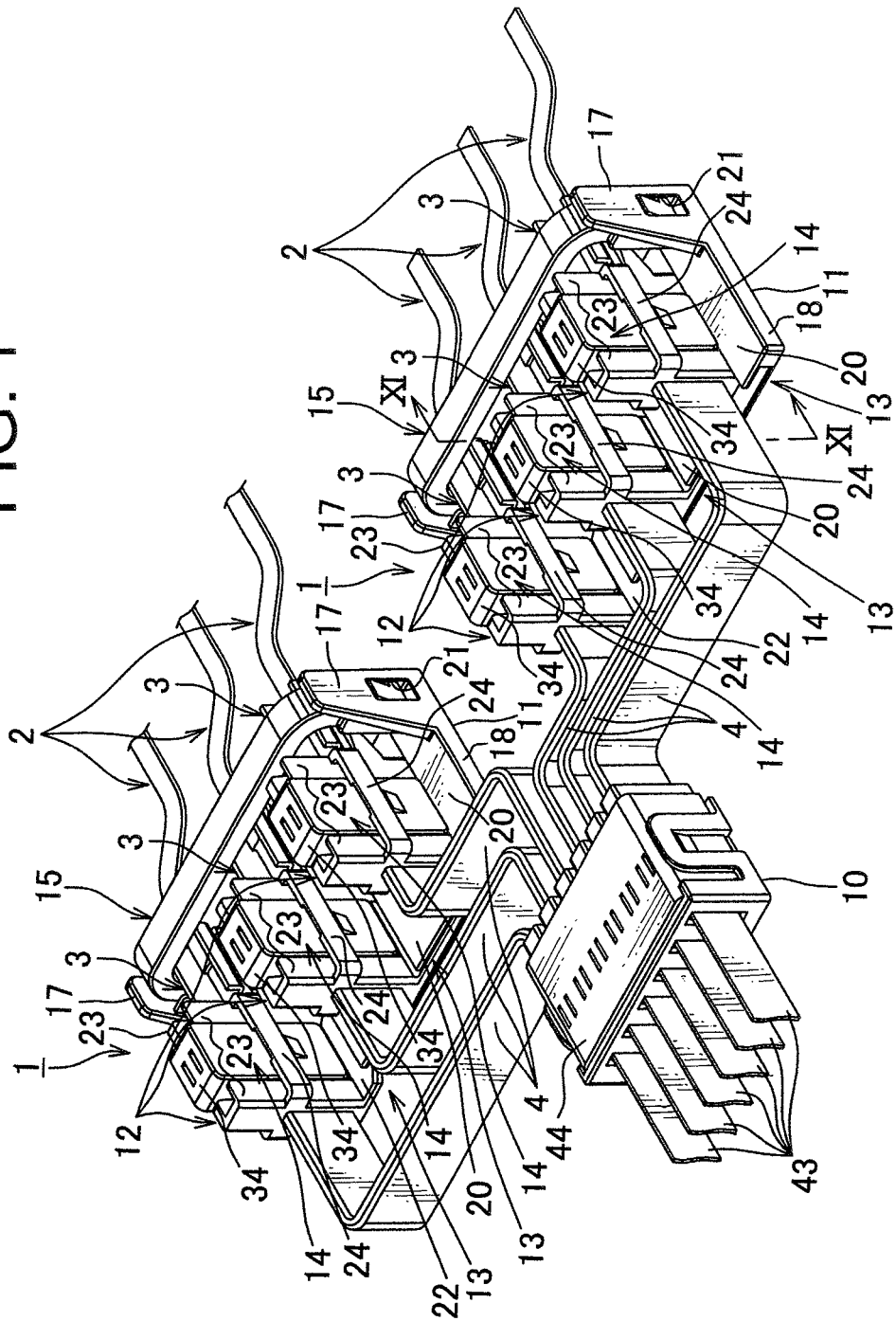
FIG. 1 is a perspective view showing a terminal connection structure according to an embodiment of the present invention.
Figure 2:
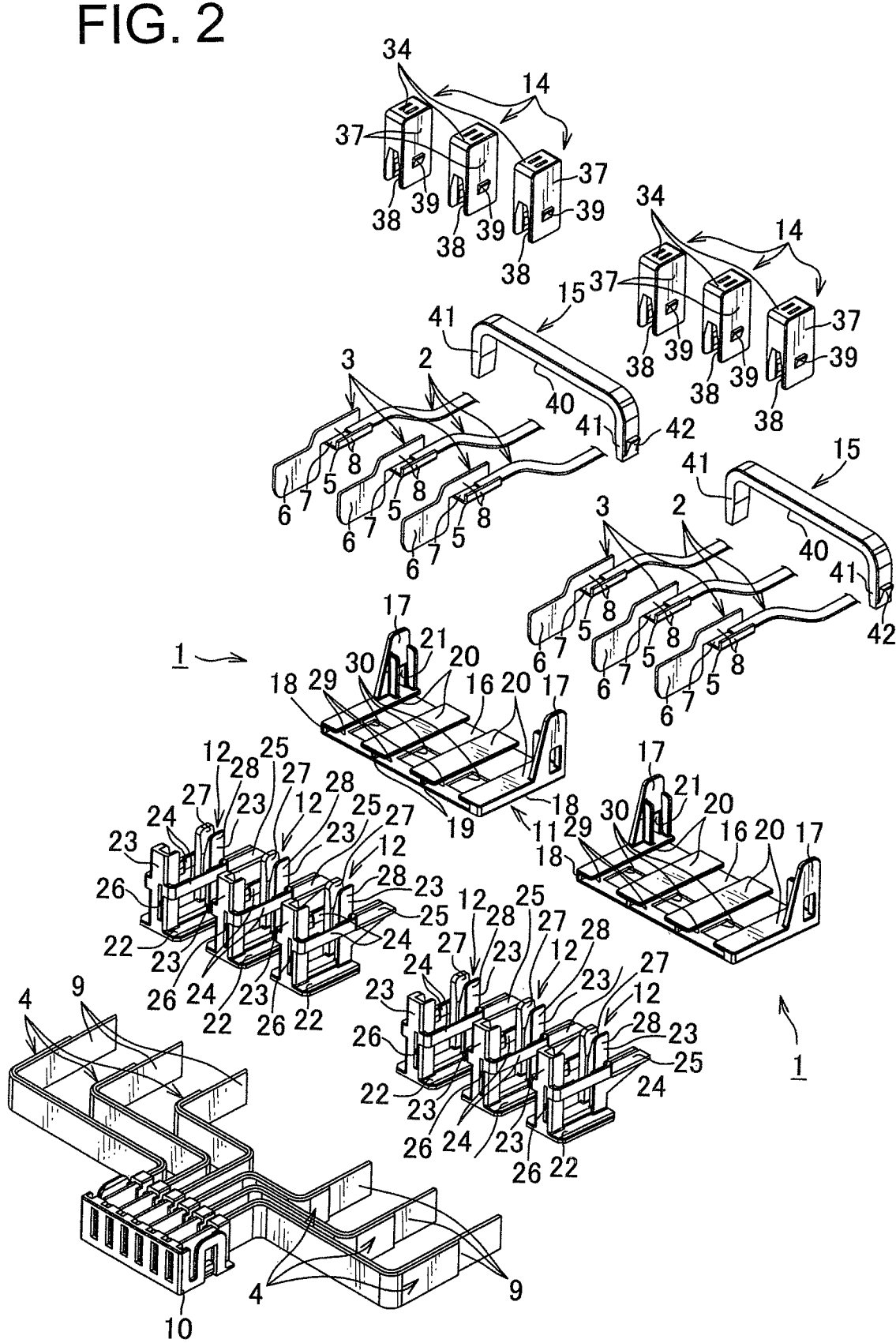
FIG. 2 is an exploded perspective view showing the terminal connection structure shown in FIG. 1.

Hereinafter, a terminal connection structure according to an embodiment of the present invention will be explained with reference to FIGS. 1 to 11. As shown in FIGS. 1 and 2, a terminal connection structure 1 according to this embodiment connects a first terminal 3 connected to a coil 2 of a motor as one power device with a busbar (e.g., second terminal) 4 as a second terminal connected to an inverter as the other power device. Incidentally, the power device of the present invention means a device to which a voltage for running a vehicle is applied such as a battery, an inverter, a motor, and a generator.

The first terminal 3 is made of conductive metal. As shown in FIG. 2, the first terminal 3 integrally includes: a gutter-shaped coil connecting section 5; and a band-plate-shaped electric contact section 6. The coil connecting section 5 integrally includes: a bottom plate section 7; and a pair of side plate sections 8 extended vertically from both edges in a width direction of the bottom plate section 7, and is formed in a gutter shape. When the coil 2 is overlapped with the bottom plate section 7, the coil 2 is attached to the coil connecting section 5. Both surfaces of the electric contact section 6 are arranged on the same plane as both surface of one of the side plate sections 8. The number of the first terminal 3 is six in an example shown in FIGS. 1 and 2. Further, a plurality of first terminals 3 is arranged parallel to each other with a gap. Namely, the surfaces of the electric contact sections 6 of the first terminals 3 are arranged parallel to each other with a gap.

The busbar 4 is made of conductive metal. As shown in FIG. 2, the busbar 4 is formed in a band plate shape and bent 90 degree at two positions, and is flexible (namely, elastically deformable). The number of the busbar 4 is six in an example shown in FIGS. 1 and 2. A thin-walled section 9 as the electric contact portion thinner than the other sections is provided on one end of the busbar 4. Further, a connector housing 10 for connecting with the inverter as the other power device is attached to the other end of the busbar 4. Further, a plurality of busbars 4 is arranged parallel to each other with a gap. Namely, surfaces of the thin-walled sections 9 of the busbars 4 are arranged parallel to each other with a gap.

The terminal connection structure 1 respectively connects three first terminals 3 with three busbars 4. Of course, the terminal connection structure 1 connects the terminal connection structure 1 with the busbar 4 one to one. Namely, in the example shown in FIGS. 1 and 2, two terminal connection structures 1 are provided. As shown in FIGS. 1 and 2, the terminal connection structure 1 includes: a base 11; a terminal holder 12; a mobile attachment section 13; a clip connector 14; and a press fixing member 15.

Figure 3:
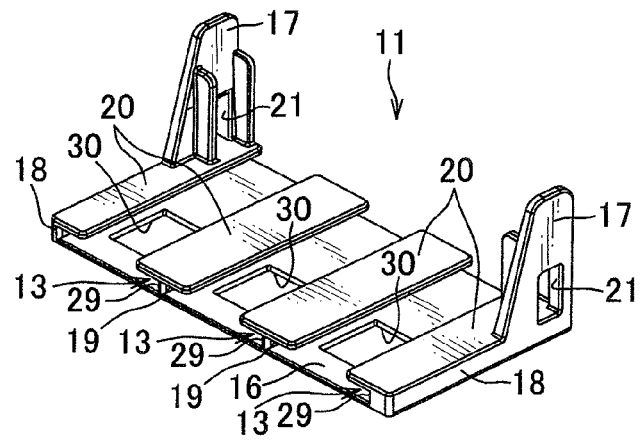
FIG. 3 is a perspective view showing a base of the terminal connection structure shown in FIG. 1.

The base 11 is made of insulating synthetic resin, and as shown in FIG. 3, integrally includes: a flat-plate-shaped bottom wall 16; a pair of vertically extended pieces 17 extended vertically from both edges of the bottom wall 16; two edge projection sections 18; two partition projection sections 19; and parallel wall sections 20. An engaging hole 21 penetrates the center of the vertically extended piece 17. The edge projection sections 18 are projected from both edges of the bottom wall 16 from which the vertically extended pieces 17 are vertically extended and arranged in the same plane as the pair of vertically extended pieces 17. Each partition projection section 19 is formed in a straight shape, and projected from the bottom wall 16. The partition projection sections 19 are arranged parallel to each other with a gap. The partition projection sections 19 are provided between the pair of vertically extended pieces 17. A longitudinal direction of the partition projection section 19 is parallel to both surfaces of the vertically extended pieces 17. The parallel wall sections 20 are respectively continued to tips of the edge projection sections 18 and the partition projection sections 19, and provided parallel to the bottom wall 16 with a gap. Further, the parallel wall sections 20 adjacent to each other are provided with a gap.

Figure 4:
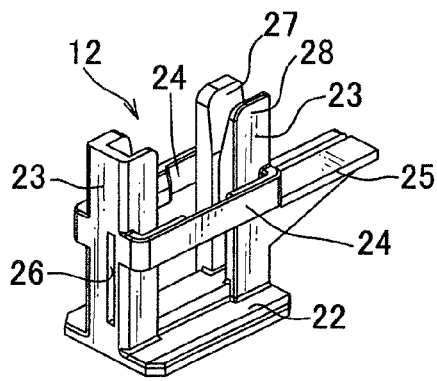
FIG. 4 is a perspective view showing a terminal holder of the terminal connection structure shown in FIG. 1.

The terminal holder 12 is made of insulating synthetic resin, and as shown in FIG. 4, integrally includes: a flat-plate-shaped bottom plate section 22 as a parallel wall; a pair of vertically extended pillars 23 extended vertically from both edges of the bottom plate section 22; a pair of coupling beams 24; and a supporting piece 25. A width of the bottom plate section 22 is formed narrower than an interval between the edge projection section 18 and the partition projection section 19 adjacent to each other, and narrower than an interval between the partition projection sections 19. The bottom plate section 22 is inserted into the interval between the edge projection section 18 and the partition projection section 19 adjacent to each other, and into the interval between the partition projection sections 19. Further, the bottom plate section 22 is inserted into between the bottom wall 16 and the parallel wall section 20.

The pair of vertically extended pillars 23 is extended vertically from both ends in a longitudinal direction of the bottom plate section 22, and provided parallel to each other with a gap. A through-hole 26 for passing the thin-walled section 9 provided on one end of the busbar 4 and not passing the other sections of the busbar 4 penetrates one vertically extended pillar 23 disposed at a front side of FIG. 4. The other vertically extended pillar 23A at a rear side of FIG. 4 is provided with a slit 27 extended from a top end to a bottom end near the bottom plate section 22 of the vertically extended pillar 23. A tapered section 28 gradually reducing a width of the slit 27 as extended toward the bottom plate section 22 is provided on a top end of the other vertically extended pillar 23.

The pair of coupling beams 24 is spaced from the bottom plate section 22. A longitudinal direction of the pair of coupling beams 24 is provided parallel to a surface of the bottom plate section 22. The pair of coupling beams 24 couples the pair of vertically extended pillars 23 to each other. The supporting piece 25 is extended from the center of the other vertically extended pillar 23 toward a direction away from the one vertically extended pillar 23. The supporting piece 25 supports the coil connecting section 5 of the first terminal 3 by overlapping the coil connecting section 5 on a surface of the supporting piece 25.

Figure 5:
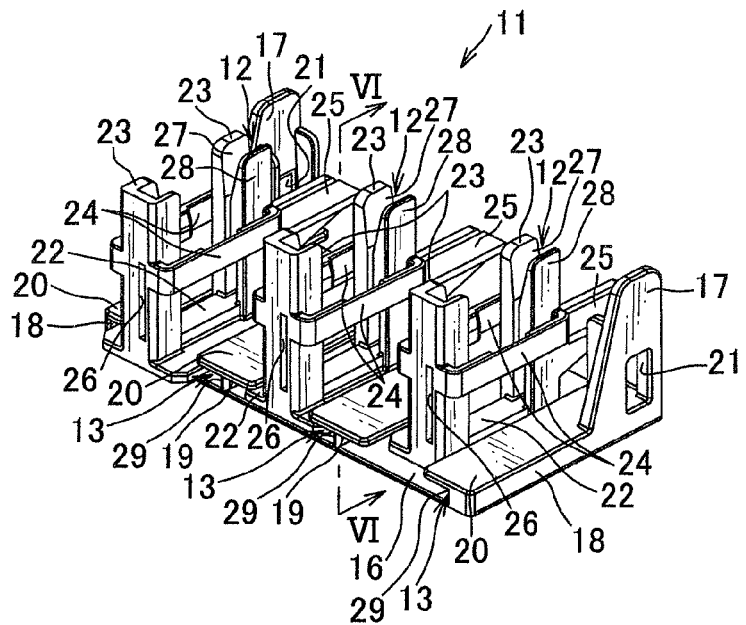
FIG. 5 is a perspective view showing a condition that the terminal holder is attached to the base of the terminal connection structure shown in FIG. 3.

As shown in FIG. 5, when the bottom plate sections 22 are inserted into the interval between the edge projection section 18 and the partition projection section 19 adjacent to each other, and into the interval between the partition projection sections 19, and inserted into between the bottom wall 16 and the parallel wall section 20, the terminal holder 12 is attached to the base 11. Then, the thin-walled sections 9 of the busbar 4 is passed through the through-hole 26 of the terminal holder 12, and the electric contact section 6 of the first terminal 3 is received in the slit 27 of the terminal holder 12. Further, the coil connecting section 5 of the first terminal 3 is overlapped with the supporting piece 25 of the terminal holder 12. Thus, the terminal holder 12 holds the thin-walled sections 9 of the busbar 4 and the electric contact section 6 of the first terminal 3 in a manner that the thin-walled sections 9 and the electric contact section 6 are overlapped with each other.

Figure 6:
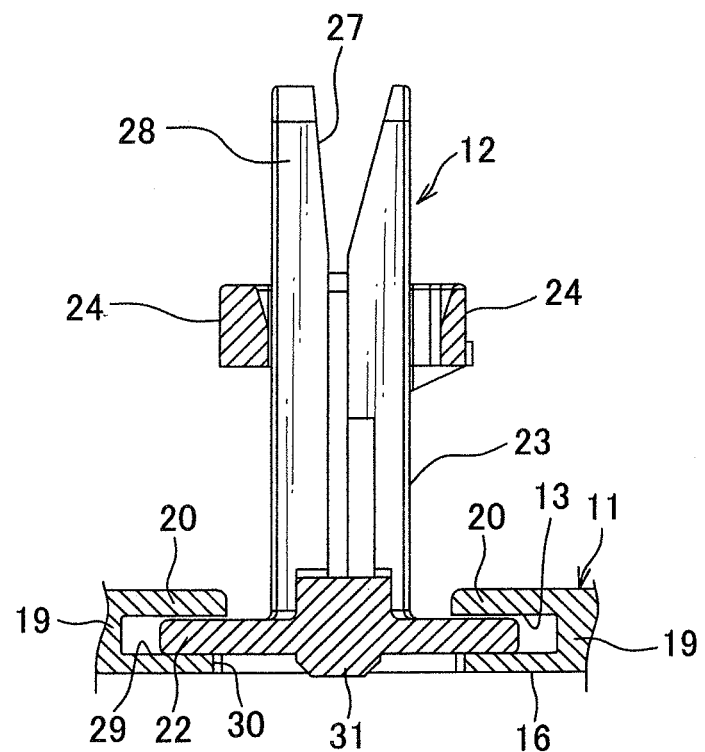
FIG. 6 is a sectional view taken on line VI-VI of FIG. 5.

As shown in FIG. 6, the mobile attachment section 13 includes: the bottom plate section 22; a holding slit 29; a dropout prevention hole 30; and a dropout prevention projection 31. As described above, the bottom plate sections 22 are inserted into the intervals between the edge projection section 18 and the partition projection section 19 adjacent to each other, between the partition projection sections 19, and between the bottom wall 16 and the parallel wall section 20, and provided parallel to the bottom wall 16. The holding slits 29 are spaces between the edge projection section 18 and the partition projection section 19 adjacent to each other, between the partition projection sections 19, and between the bottom wall 16 and the parallel wall section 20. Resultingly, in an example shown in FIG. 3, the number of the holding slit 29 is three. The holding slit 29 is formed wider (larger) than an outer shape of the bottom plate section 22. When the bottom plate section 22 is received in an inside of the holding slit 29, the bottom plate section 22, namely, the terminal holder 12 becomes movable in a direction parallel to a surface of the bottom wall 16.

The dropout prevention hole 30 is a rectangular hole in a plan view penetrating the bottom wall 16. The number of the dropout prevention hole 30 is the same as the terminal holder 12, namely, the holding slit 29. The dropout prevention hole 30 is respectively provided on the interval between the edge projection section 18 and the partition projection section 19 adjacent to each other of the bottom wall 16 and on the interval between the partition projection sections 19 one by one. The dropout prevention projection 31 is projected from the bottom plate section 22 of the terminal holder 12 in a direction opposite to the vertically extended pillars 23. As shown in FIG. 6, by entering an inside of the dropout prevention hole 30, the dropout prevention projection 31 prevents the bottom plate section 22, namely, the terminal holder 12 from dropping out of the bottom wall 16, namely, the base 11. A planar shape of the dropout prevention projection 31 is smaller enough than a planar shape of the dropout prevention hole 30 so that the dropout prevention projection 31 does not interfere with a movement of the bottom plate section 7 in the holding slit 29, namely, the shape of the dropout prevention projection 31 is so formed as to allow the bottom plate section 22 movable throughout the holding slit 29.

In the mobile attachment section 13, when the bottom plate section 22 is received in the holding slit 29, and the dropout prevention projection 31 enters the dropout prevention hole 30, the terminal holder 12 is attached to the base 11 movable in a direction parallel to a surface of the bottom wall 16.

Figure 11:
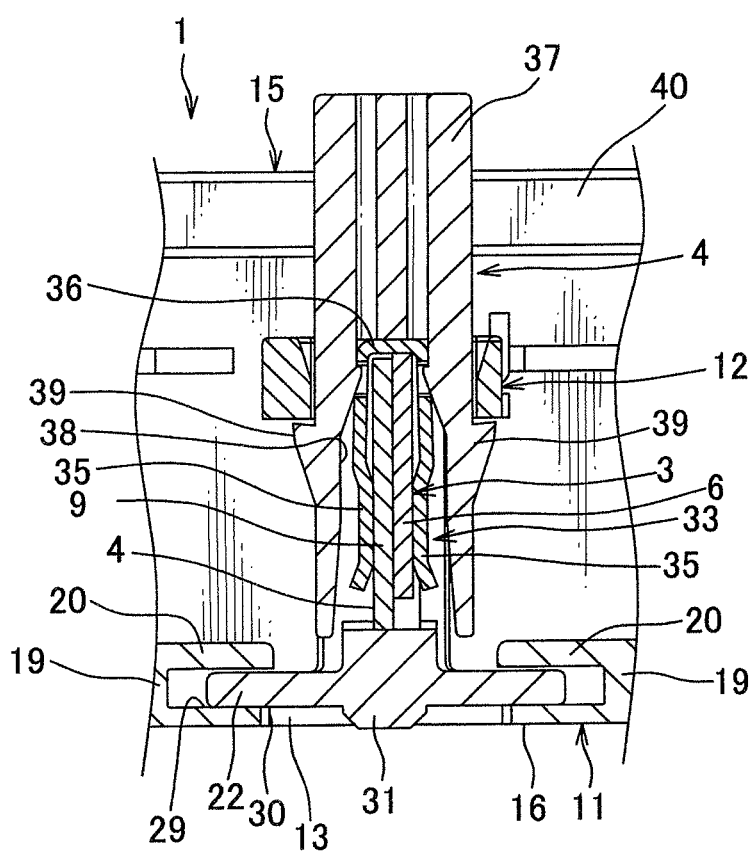
FIG. 11 is a sectional view taken on line XI-XI of FIG. 1.

The number of the clip connector 14 is the same as the terminal holder 12 and the holding slit 29 (three in an example shown in figures). As shown in FIG. 11, the clip connector 14 includes: a clip terminal 33; and a clip terminal holder 34.

Figure 7A:
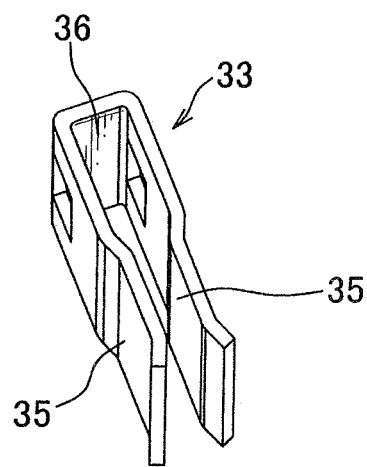
FIGS. 7A and 7B are perspective views showing a clip terminal of the terminal connection structure shown in FIG. 1.
Figure 7B:
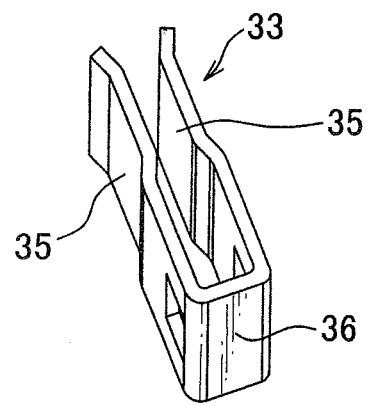

The clip terminal 33 is made of conductive metal. As shown in FIGS. 7A and 7B, the clip terminal 33 integrally includes: a pair of contact pieces 35 formed in substantially a plate shape, and arranged parallel to each other with a gap; and a bias coupling section 36 respectively continued to the contact pieces 35. As shown in FIG. 11, the clip terminal 33 holds the electric contact section 6 of the first terminal 3 and the thin-walled section 9 of the busbar 4 overlapped with each other between the pair of contact pieces 35. When the clip terminal 33 holds the electric contact section 6 of the first terminal 3 and the thin-walled section 9 of the busbar 4 overlapped with each other between the pair of contact pieces 35, an elastic restoring force for biasing the pair of contact pieces 35 holding the electric contact section 6 and the thin-walled section 9 therebetween in a direction close to each other is generated in the bias coupling section 36.

The clip terminal holder 34 is made of insulating synthetic resin. As shown in FIG. 11, the clip terminal holder 34 includes: a box-shaped holder main body 37; a terminal receiving space 38 provided at one end in a longitudinal direction of the holder main body 37; and a pair of locking projections 39 as engaging sections. The terminal receiving space 38 is provided on the holder main body 37, and opened on an end wall at the one end of the holder main body 37. The terminal receiving space 38 receives the clip terminal 33 therein. The locking projection 39 is projected outward from an outer sidewall of at the one end of the holder main body 37, and locked with the coupling beam 24 so as to attach the clip terminal holder 34, namely, the clip connector 14 to the terminal holder 12.

The clip connector 14 having the above described configuration is assembled by receiving the clip terminal 33 in the terminal receiving space 38, and by covering the clip terminal 33 with the clip terminal holder 34. Then, the clip connector 14 is positioned in a condition that the clip terminal 33 faces the pair of vertically extended pillars 23 of the terminal holder 12 in a direction perpendicular to (crossing) the longitudinal direction of the thin-walled section 9 of the busbar 4 and the electric contact section 6 of the first terminal 3 held by the terminal holder 12. Then, the clip connector 14 is moved close to an interval between the pair of vertically extended pillars 23, namely, the terminal holder 12 in a manner that a tip of the contact piece 35 of the clip terminal 33 is moved close to the electric contact section 6 and the thin-walled section 9 overlapped with each other. As a result, of course, the clip terminal 33 is moved close to the electric contact section 6 of the first terminal 3 and the thin-walled section 9 of the busbar 4 along a direction perpendicular to (crossing) the longitudinal direction of the electric contact section 6 of the terminal connection structure 1 and the thin-walled section 9 of the busbar 4 overlapped with each other. Then, as shown in FIG. 11, when the clip terminal 33 holds the electric contact section 6 of the first terminal 3 and the thin-walled section 9 of the busbar 4 overlapped with each other between the pair of contact pieces 35, and the locking projection 39 is locked with the coupling beam 24 in a manner that the clip terminal holder 34 is interposed between the pair of vertically extended pillars 23, the clip connector 14 is fixed to the terminal holder 12.

The press fixing member 15 is made of insulating synthetic resin. As shown in FIG. 4, the press fixing member 15 includes: a bar-shaped member main body 40; a pair of engaging beams 41 extended vertically from both ends in a longitudinal direction of the member main body 40; and an engaging projection 42. Each engaging beam 41 is formed in a bar shape, and provided parallel to each other, and extended in the same direction from both ends of the member main body 40. The engaging projection 42 is projected outward from an outer sidewall of the engaging beams 41, and engaged with the engaging hole 21 of the vertically extended piece 17 of the base 11. When the engaging projection 42 is engaged with the engaging hole 21 of the vertically extended piece 17 of the base 11, the press fixing member 15 is attached to the base 11. When the press fixing member 15 is attached to the base 11, the member main body 40 abuts on the coil connecting section 5 of the first terminal 3 held by the terminal holder 12 and pushes the coil connecting section 5 toward the supporting piece 25, namely, the bottom wall 16 of the base 11.

The above terminal connection structure 1 is assembled as below. The terminal holder 12 is attached to the base 11, and the thin-walled section 9 is passed through the through-hole 26 of the terminal holder 12 so that the busbar 4 is held in the terminal holder 12. Further, the connector housing 10 for connecting the inverter as the other power device is attached to the other end of the busbar 4.

Figure 8:
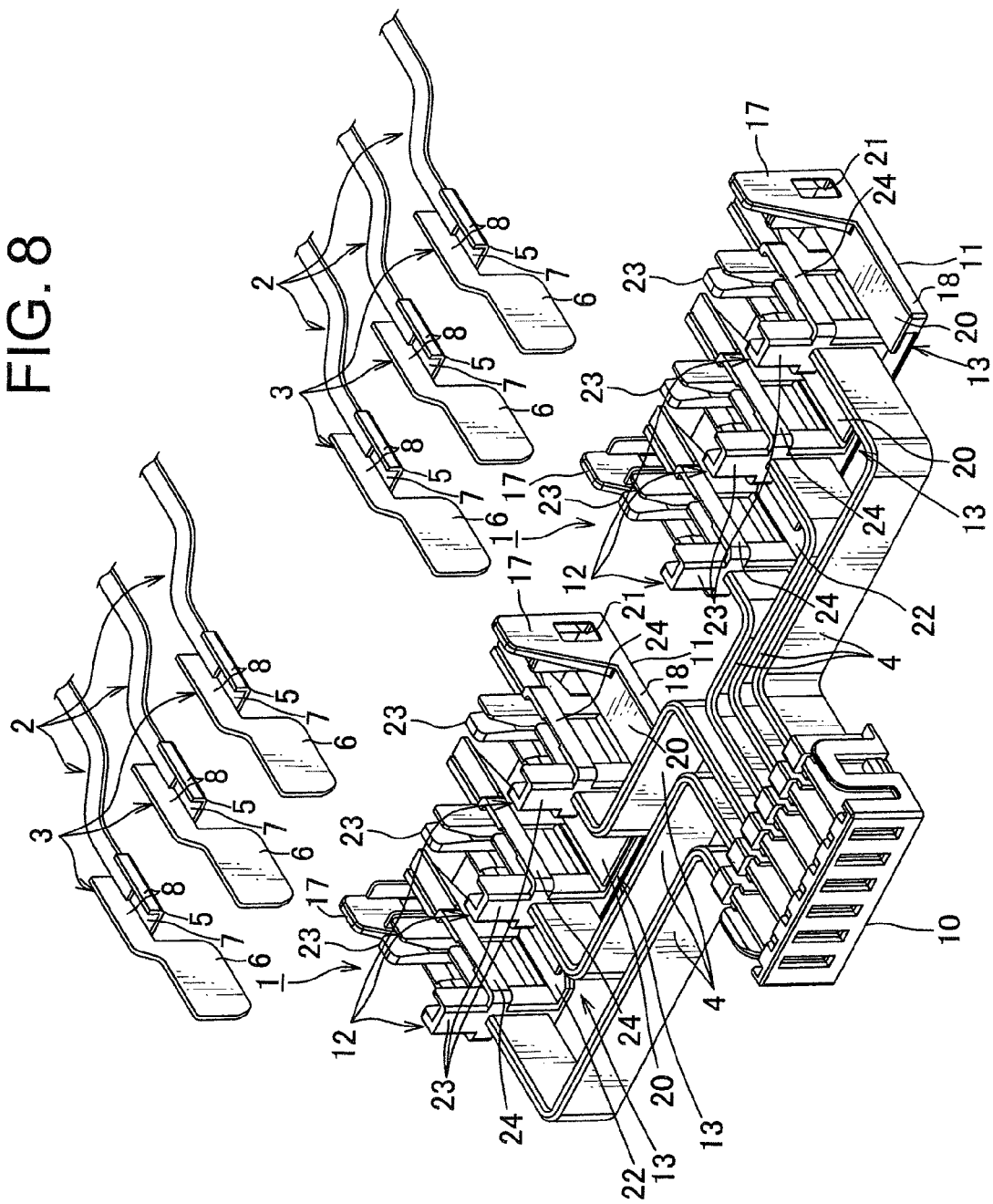
FIG. 8 is a perspective view showing a condition that a busbar is held in the terminal holder of the terminal connection structure shown in FIG. 5.

Then, as shown in FIG. 8, after the electric contact section 6 of the first terminal 3 is arranged facing the slit 27 of the terminal holder 12 along a longitudinal direction of the slit 27, the electric contact section 6 of the first terminal 3 is inserted into the slit 27 of the terminal holder 12. Then, as shown in FIG. 9, the first terminal 3 is held in the terminal holder 12 attached to the base 11.

Figure 9:
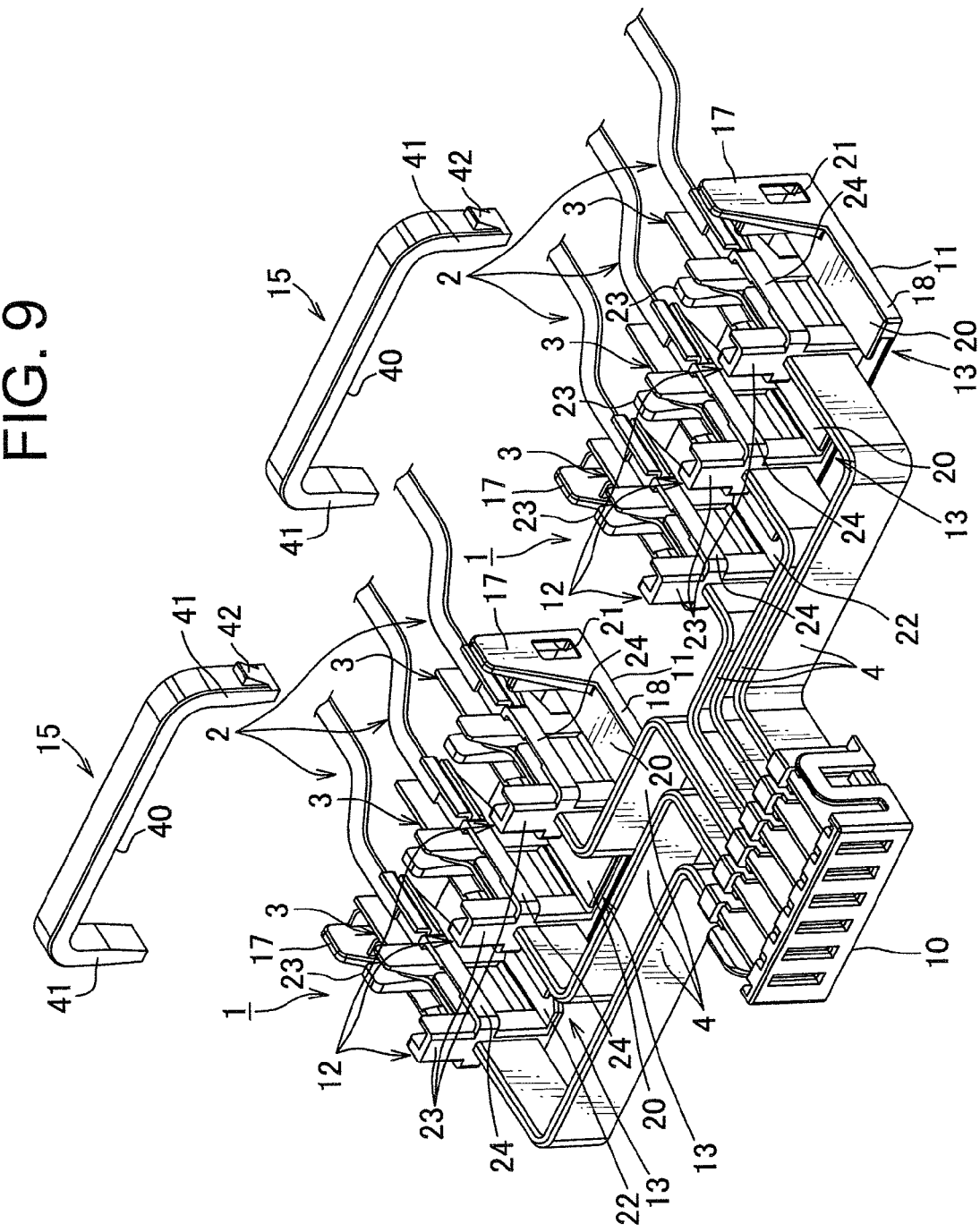
FIG. 9 is a perspective view showing a condition that a first terminal is held in the terminal holder of the terminal connection structure shown in FIG. 8.
Figure 10:
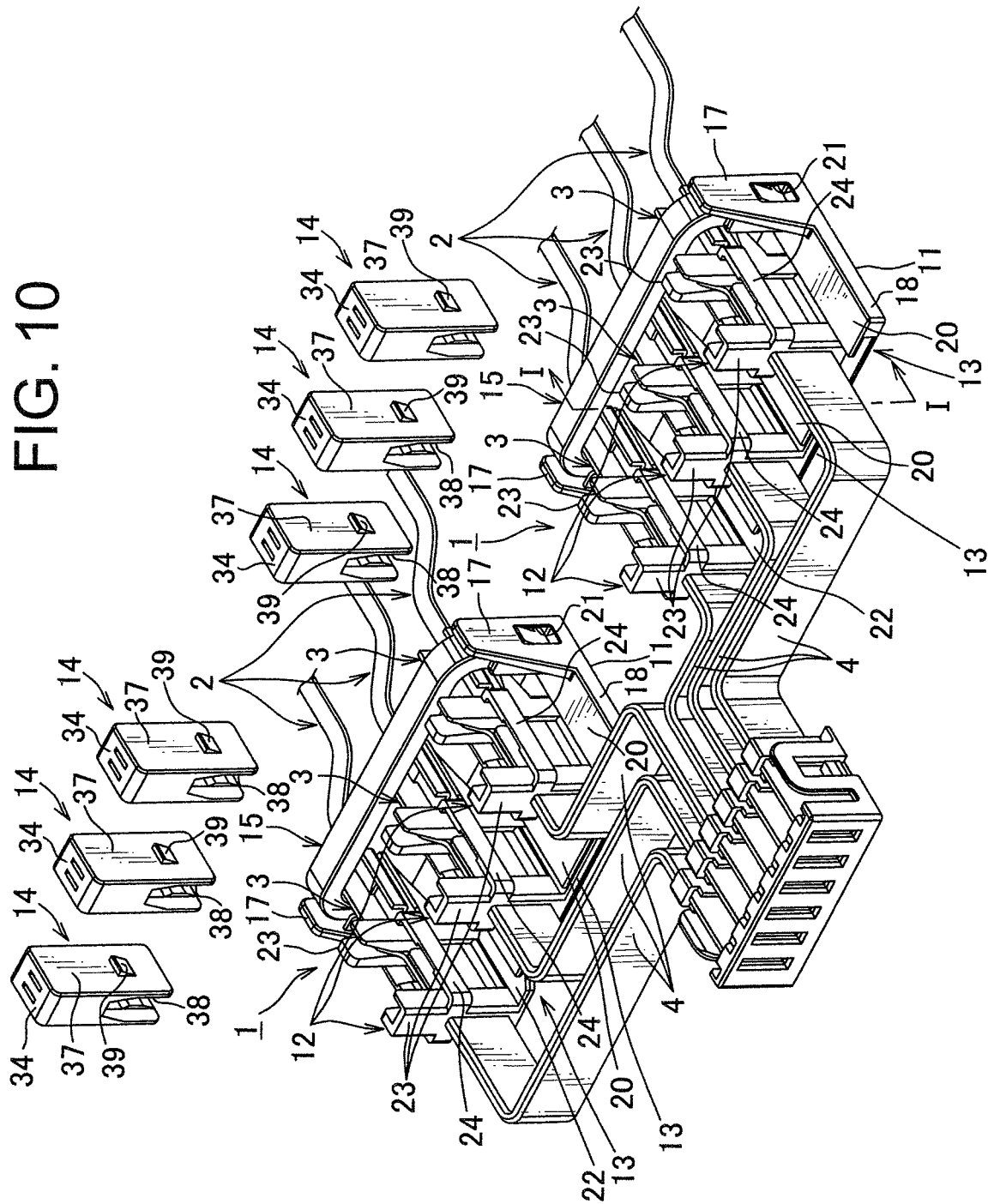
FIG. 10 is a perspective view showing a condition that a press fixing section is attached to the base of the terminal connection structure shown in FIG. 1.

Then, as shown in FIG. 9, after the press fixing member 15 is arranged facing the supporting piece 25 of the terminal holder 12 along a direction perpendicular to (crossing) the longitudinal direction of the electric contact section 6 and the thin-walled section 9 held in the terminal holder 12, the press fixing member 15 is inserted into between the pair of vertically extended pieces 17 of the base 11. Then, as shown in FIG. 10, when the engaging projection 42 is engaged with the engaging hole 21, the press fixing member 15 is attached to the base 11. At this time, of course, the press fixing member 15 pushes the coil connecting section 5 of the first terminal 3 toward the bottom wall 16 of the base 11.

Then, as shown in FIG. 10, after the clip connector 14 is arranged facing an interval between the pair of vertically extended pillars 23 of the terminal holder 12 along a direction perpendicular to (crossing) the longitudinal direction of the electric contact section 6 and the thin-walled section 9 held in the terminal holder 12, the clip connector 14 is inserted between the pair of vertically extended pillars 23. Then, when the locking projections 39 are locked with the coupling beams 24, the clip connector 14 is attached to the terminal holder 12. At this time, of course, when the clip connector 14 is moved close to the terminal holder 12, the electric contact section 6 of the first terminal 3 and the thin-walled section 9 of the busbar 4 are caught between the pair of contact pieces 35 of the clip terminal 33. At this time, even if the electric contact section 6 of the first terminal 3 and the thin-walled sections 9 of the busbar 4 are separated with each other due to a positional offset of the coil 2 of the motor or the like, as they are inserted between the contact pieces 35 of the clip terminal 33, due to the elastic restoring force of the bias coupling section 36 and the mobile attachment section 13, the busbar 4 is elastically deformed and the terminal holder 12 is moved relative to the base 11 so that the electric contact section 6 and the thin-walled sections 9 are closely attached to each other. Thus, when the locking projections 39 are locked with the coupling beams 24, as shown in FIG. 11, the electric contact section 6 of the first terminal 3 and the thin-walled section 9 of the busbar 4 are closely overlapped with each other due to the elastic restoring force of the bias coupling section 36 of the clip terminal 33. Thus, the terminal connection structure 1 is assembled, and the busbar 4 and the first terminal 3 are connected to each other. Then, when busbars 43 connected to the inverter as the other power device and a joint connector 44 are attached to the connector housing 10, the motor as the one power device and the inverter as the other power device are connected to each other. Further, the terminal connection structure 1 assembled as above described is received in a housing of the motor or the like.

According to this embodiment, when the bottom plate section 22 as the parallel wall provided on one of the terminal holder 12 and the base 11 is inserted into the holding slit 29 that is larger than the bottom plate section 22, the terminal holder 12 becomes movable in a direction parallel to a surface of the bottom wall 16 of the base 11. Therefore, there is nothing that prevents the terminal holder 12 from moving other than an inner wall of the holding slit 29. Therefore, the terminal holder 12 becomes movable with respect to the bottom wall 16 of the base 11 within a gap between the holding slit 29 and the bottom plate section 22. Therefore, by adjusting properly a size of the holding slit 29, the first terminal 3 can be moved widely with respect to the base 11, and even if the positional offset between the first terminal 3 and the busbar 4 is great, they are surely connected to each other.

When the electric contact section 6 of the first terminal 3 and the thin-walled section 9 of the busbar 4 are held between the pair of contact pieces 35 of the clip terminal 33 close to them along a direction perpendicular to (crossing) a longitudinal direction of them overlapped with each other, they are connected to each other. Therefore, even if the electric contact section 6 of the first terminal 3 and the thin-walled section 9 of the busbar 4 are arranged parallel to each other with a gap, they can be surely connected to each other. Therefore, when the electric contact section 6 of the first terminal 3 and the thin-walled section 9 of the busbar 4 are arranged parallel to each other with a gap, a width of the terminal connection structure 1 can be further reduced than when they are arranged on the same plane. As a result, the terminal connection structure 1 can be downsized.

Further, because the clip terminal 33 includes the pair of contact pieces 35 and the bias coupling section 36 biasing the pair of contact pieces 35 toward a direction close to each other, the electric contact section 6 and the thin-walled section 9 overlapped with each other can be held between the pair of contact pieces 35. Therefore, the first terminal 3 and the busbar 4 can be surely and electrically connected to each other.

Because the terminal connection structure 1 includes the clip terminal holder 34 covering the clip terminal 33 and locked with the terminal holder 12, the clip terminal holder 34 prevents the clip terminal 33 from falling out. Therefore, a connection between the first terminal 3 and the busbar 4 is prevented from being released unexpectedly.

Because the terminal connection structure 1 includes the press fixing member 15 pressing the first terminal 3 toward the bottom wall 16 of the base 11 when attached to the base 11, the first terminal 3 can be positioned in a thickness direction of the bottom wall 16 of the base 11 by the press fixing member 15.

According to the above described embodiment, the holding slit 29 is provided on the base 11, and the bottom plate section 22 as the parallel wall is provided on the terminal holder 12. However, according to the present invention, the holding slit 29 may be provided on the terminal holder 12, and the bottom plate section 22 as the parallel wall may be provided on the base 11.

Incidentally, the above embodiment only shows a representative example of the present invention. The present invention is not limited to the embodiment. Namely, various modifications can be practiced within a scope of the present invention.

REFERENCE SIGNS LIST

1 terminal connection structure
3 first terminal
4 busbar (e.g., second terminal)
11 base
12 terminal holder
13 mobile attachment section
15 press fixing member
16 bottom wall
22 bottom plate section (parallel wall)
29 holding slit
33 clip terminal
34 clip terminal holder
35 contact piece
36 bias coupling section
39 locking projection (locking section)

The invention claimed is:

1. A terminal connection structure for connecting a second terminal to a first terminal which is connected to a power device,
said terminal connection structure comprising:
a base having a bottom wall;
a terminal holder that can hold the first and second terminals in an overlapping state;
a mobile attachment section having a parallel wall that is provided on one of the base and the terminal holder and that is parallel to the bottom wall, and a holding slit that is provided to the other of the base and the terminal holder, is entered by the parallel wall, and is larger than a width of the parallel wall, and attaching the terminal holder to the base movably and parallel to a surface of the bottom wall which faces the terminal holder; and
a press fixing member configured to be removably attached to the base, and pressing the first terminal toward the bottom wall when attached to the base.

2. The terminal connection structure as claimed in claim 1, further comprising:
a clip terminal having a pair of contact pieces for holding the first and second terminals in the overlapping state therebetween, and a bias coupling section continued to the pair of contact pieces and biasing the pair of contact pieces holding the first and second terminals therebetween toward a direction close to each other,
said clip terminal configured to be moved close to the terminal holder in a direction crossing the first and second terminals in the overlapping state, and attached to the terminal holder with the pair of contact pieces holding the first and second terminals in the overlapping state therebetween.

3. The terminal connection structure as claimed in claim 2, further comprising:
a clip terminal holder covering the clip terminal and having a locking section to be locked with the terminal holder.

* * * * *